(12) United States Patent
Cohen et al.

(10) Patent No.: US 11,108,667 B2
(45) Date of Patent: *Aug. 31, 2021

(54) RESOURCE ALLOCATION CONTROL BASED ON CONNECTED DEVICES

(71) Applicant: The Toronto-Dominion Bank, Toronto (CA)

(72) Inventors: Evan Cohen, Toronto (CA); Kevin Mari, Toronto (CA); Matthew Hamilton, Toronto (CA); Jonathan K. Barnett, Toronto (CA); Paul Mon-Wah Chan, Toronto (CA); John Jong-Suk Lee, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/506,660

(22) Filed: Jul. 9, 2019

(65) Prior Publication Data

US 2019/0334805 A1 Oct. 31, 2019

Related U.S. Application Data

(63) Continuation of application No. 15/152,286, filed on May 11, 2016, now Pat. No. 10,355,955.

(Continued)

(51) Int. Cl.
*H04L 12/26* (2006.01)
*H04M 15/00* (2006.01)
(Continued)

(52) U.S. Cl.
CPC ........ *H04L 43/0876* (2013.01); *H04L 12/283* (2013.01); *H04L 41/0896* (2013.01);
(Continued)

(58) Field of Classification Search
CPC .............. H04L 12/283; H04L 41/0896; H04L 43/0876; H04W 4/24; H04W 4/70; G06Q 40/00; G06Q 40/12
See application file for complete search history.

(56) References Cited

U.S. PATENT DOCUMENTS 6,956,500 B1 10/2005 Ducharme et al.
6,980,973 B1 12/2005 Karpenko
(Continued)

FOREIGN PATENT DOCUMENTS

AU 2012227162 10/2012
WO WO200109107 11/2001
(Continued)

OTHER PUBLICATIONS

Accenture, "The Bank of Things—How the Internet of Things will Transform Financial Services," copyright 2014, 12 pages.
(Continued)

*Primary Examiner* — Pao Sinkantarakorn
(74) *Attorney, Agent, or Firm* — Fish & Richardson P.C.

(57) ABSTRACT

The present disclosure involves systems and computer implemented methods for implementing a resource allocation and adjusting resource usage and spending based on information received from a plurality of network-connected devices. One example method includes identifying a new connected device replacing an existing device associated with a resource allocation, the resource allocation defining an expected resource usage for a plurality of devices (including the existing device), obtaining historical resource usage information associated with the existing device, identifying the existing device's operational parameters, and determining an expected resource usage for the new connected device after replacement. A change in the expected resource usage in the resource allocation is calculated based on the obtained historical resource usage information associated with the (Continued)

existing device and the expected resource usage amount for the new connected device. The master resource allocation is then updated based on the calculated change.

20 Claims, 6 Drawing Sheets

Related U.S. Application Data

(60) Provisional application No. 62/249,690, filed on Nov. 2, 2015, provisional application No. 62/249,676, filed on Nov. 2, 2015, provisional application No. 62/160,074, filed on May 12, 2015.

(51) Int. Cl.
*H04L 12/24* (2006.01)
*H04L 12/28* (2006.01)
*H04L 12/911* (2013.01)
*H04L 29/08* (2006.01)
*H04W 24/08* (2009.01)
*H04W 4/70* (2018.01)

(52) U.S. Cl.
CPC .............. *H04L 47/70* (2013.01); *H04L 67/10* (2013.01); *H04M 15/88* (2013.01); *H04W 4/70* (2018.02); *H04W 24/08* (2013.01)

(56) References Cited

U.S. PATENT DOCUMENTS

| | | | |
|---|---|---|---|
| 7,657,440 | B2 | 2/2010 | Kuwata et al. |
| 8,140,414 | B2 | 3/2012 | O'Neil et al. |
| 8,275,698 | B2 | 9/2012 | Boss et al. |
| 8,566,227 | B2 | 10/2013 | Carroll et al. |
| 9,500,385 | B2 | 11/2016 | Wagner |
| 10,019,739 | B1 | 7/2018 | Packer et al. |
| 10,024,564 | B2 | 7/2018 | Frank et al. |
| 10,061,289 | B2 | 8/2018 | Haghighat-Kashani et al. |
| 2001/0032109 | A1 | 10/2001 | Gonyea et al. |
| 2001/0049618 | A1 | 12/2001 | Patzel et al. |
| 2002/0005668 | A1 | 1/2002 | Couture |
| 2003/0036918 | A1 | 2/2003 | Pintsov |
| 2003/0055766 | A1 | 3/2003 | Blanchard et al. |
| 2004/0177705 | A1 | 9/2004 | Donat et al. |
| 2005/0075975 | A1 | 4/2005 | Rosner |
| 2005/0143865 | A1 | 6/2005 | Gardner |
| 2006/0155904 | A1 | 7/2006 | Murakami |
| 2007/0124606 | A1 | 5/2007 | Hsieh |
| 2007/0203860 | A1 | 8/2007 | Golden et al. |
| 2008/0096524 | A1 | 4/2008 | True et al. |
| 2011/0046805 | A1 | 2/2011 | Bedros et al. |
| 2011/0218703 | A1 | 9/2011 | Uchida |
| 2011/0307141 | A1 | 12/2011 | Westerlage et al. |
| 2012/0078781 | A1 | 3/2012 | Ross et al. |
| 2012/0191602 | A1 | 7/2012 | Wright et al. |
| 2012/0239595 | A1 | 9/2012 | Kiuchi et al. |
| 2012/0306882 | A1 | 12/2012 | Kashiwagi |
| 2012/0323385 | A1 | 12/2012 | Thiruvengada et al. |
| 2013/0013936 | A1 | 1/2013 | Lin et al. |
| 2013/0030994 | A1 | 1/2013 | Calman et al. |
| 2013/0185437 | A1 | 7/2013 | Willig et al. |
| 2013/0207702 | A1 | 11/2013 | Pal et al. |
| 2013/0346302 | A1 | 12/2013 | Purves et al. |
| 2014/0006329 | A1 | 1/2014 | Hu et al. |
| 2014/0180847 | A1 | 6/2014 | Silverstein et al. |
| 2014/0244017 | A1 | 8/2014 | Freiwirth et al. |
| 2014/0244834 | A1 | 8/2014 | Guedalia et al. |
| 2015/0095478 | A1 | 4/2015 | Zuerner |
| 2016/0147205 | A1 | 5/2016 | Kaufman |
| 2016/0170428 | A1 | 6/2016 | Ichien et al. |
| 2016/0337221 | A1 | 11/2016 | Cohen et al. |
| 2017/0124541 | A1 | 5/2017 | Aggarwal |

FOREIGN PATENT DOCUMENTS

| | | |
|---|---|---|
| WO | WO2010099348 | 9/2010 |
| WO | WO20140151121 | 9/2014 |

OTHER PUBLICATIONS

Hartman et al., "Smart Meters, Big Data, and Customer Engagement: In Pursuit of the Perfect Portal," Copyright 2014, 11 pages.
Kwan et al, "Wireless Sensors with Advanced Detection and Prognostic Capabilities for Corrosion Health Management," Advanced Materials Research, vol. 38, pp. 123-131, Year: 2008.
"Liebman; Jeffrey et al., ""Do Expiring Budgets Lead to Wasteful Year-End Spending? Evidence from Federal Procurement"", Sep. 2013, National Bureau of Economic Research (Year: 2013)".
LTP Let's Talk Payments, "How to Integrate Payments in IoT Devices?," May 27, 2015, 5 pages.
Pye, "The Internet of Things connecting the unconnected," Engineering & Technology, Dec. 2014, 5 pages.
VUB—Visual Utility Billing, "Power Utility Billing Software Streamlines Your Work," Copyright 2015, 1 page.
Wentzlaff, "The Decision Maker Internet of Things: Retail Banking (Bank of Things)," Feb. 3, 2015, 7 pages.

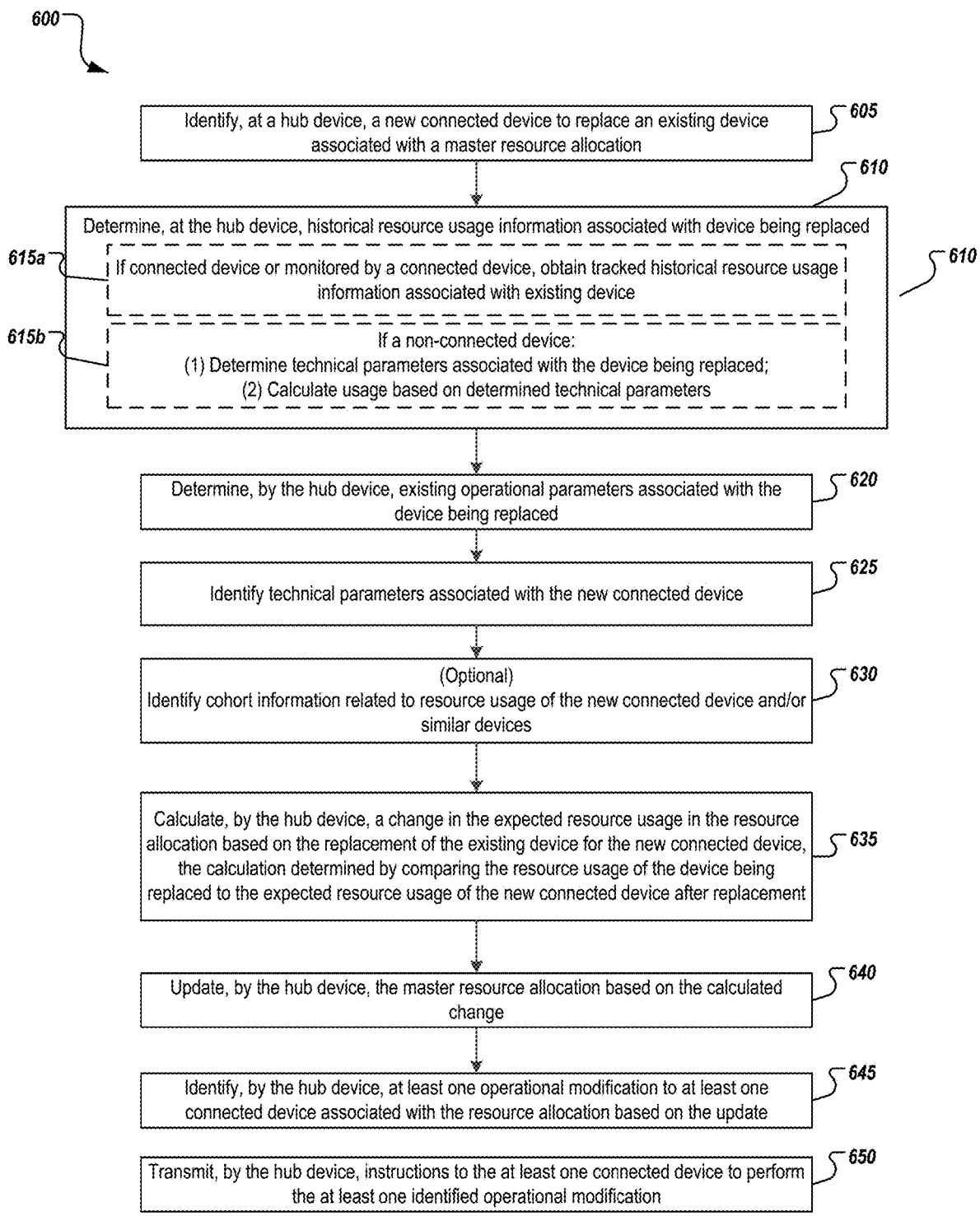
FIG. 6 – Expected Usage of Replacement Device

RESOURCE ALLOCATION CONTROL BASED ON CONNECTED DEVICES

CROSS-REFERENCE TO RELATED APPLICATIONS

This application is a continuation of and claims the benefit of priority to U.S. patent application Ser. No. 15/152,286, filed May 11, 2016, which claims priority to U.S. Provisional Application Ser. No. 62/249,676, filed on Nov. 2, 2015, U.S. Provisional Application Ser. No. 62/160,074, filed on May 12, 2015, and U.S. Provisional Application Ser. No. 62/249,690, filed on Nov. 2, 2015, the entire contents of which are hereby incorporated by reference. This application is also related to U.S. patent application Ser. No. 15/152,296, now issued as U.S. Pat. No. 10,193,756 on Jan. 29, 2019, and U.S. patent application Ser. No. 15,152,297, filed on May 11, 2016, the contents of each are hereby incorporated by reference.

TECHNICAL FIELD

The present disclosure relates to computer systems and computer-implemented methods for implementing a resource allocation and adjusting resource usage and spending based on information received from a plurality of network-connected devices.

The network of connected devices can include a network of physical objects, or "things," embedded within electronics, software, sensors, and connectivity to enable and achieve greater value and service by exchanging data with the manufacturer, operator, and/or other connected devices or systems. Each thing can be uniquely identifiable through its embedded computing system, and can interoperate through the existing Internet or local network infrastructure. In many cases, implementations of the network can provide services including machine-to-machine communications (M2M), such that information received from one machine can influence or modify the actions and activities of other machines.

SUMMARY

The present disclosure involves systems and computer implemented methods for implementing a budget and adjusting spending based on information received from a plurality of network-connected devices. One example method is performed by identifying a new connected device replacing an existing device associated with a master resource allocation, the master resource allocation defining an expected resource usage for a plurality of devices, the plurality of devices including the existing device, obtaining historical resource usage information associated with the existing device, identifying a set of existing operational parameters associated with the existing device, and determining an expected resource usage amount for the new connected device after replacement of the existing device. A change in the expected resource usage in the resource allocation is calculated based on the obtained historical resource usage information associated with the existing device and the expected resource usage amount for the new connected device. The master resource allocation is then updated based on the calculated change.

In some instances, the existing device being replaced by the new connected device is a connected device. In those instances, obtaining the historical resource usage information associated with the existing device may comprise obtaining a set of tracked historical usage information associated with the existing device.

In some instances, the existing device being replaced by the new connected device is a non-connected device. In those instances, obtaining the historical resource usage information associated with the existing device may comprise determining technical parameters associated with the existing device being replaced and calculating historical resource usage by the existing device based, at least in part, on the determined technical parameters associated with the existing device and a tracked resource usage associated with the non-connected device.

In some instances, determining the expected resource usage amount for the new connected device after replacement of the existing device may comprise identifying operational parameters associated with historical usage of the existing device and estimating a resource usage amount for the new connected device based on a calculation of the resource usage amount for the new connected device operating using the identified operational parameters associated with the historical usage of the existing device.

In some instances, the method or operations may include identifying at least one operational modification to at least one connected device of the plurality of devices associated with the master resource allocation based on the calculated change. In those instances, the method or operations may further include transmitting instructions to the at least one connected device to perform the at least one identified operational modification.

In some instances, at least one of the historical resource usage information associated with the existing device, the set of existing operational parameters associated with the existing device, and the expected resource usage amount for the new connected device is obtained by the device hub from a remote system.

In some instances, the device hub may be incorporated into a first connected device of the plurality of connected devices.

While generally described as computer-implemented software embodied on tangible, non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 6 is a flowchart of an example operation 600 for determining a modification to an existing resource allocation in light of a newly added connected device replacing an existing device included in the existing resource allocation.

DETAILED DESCRIPTION

Figure 1:
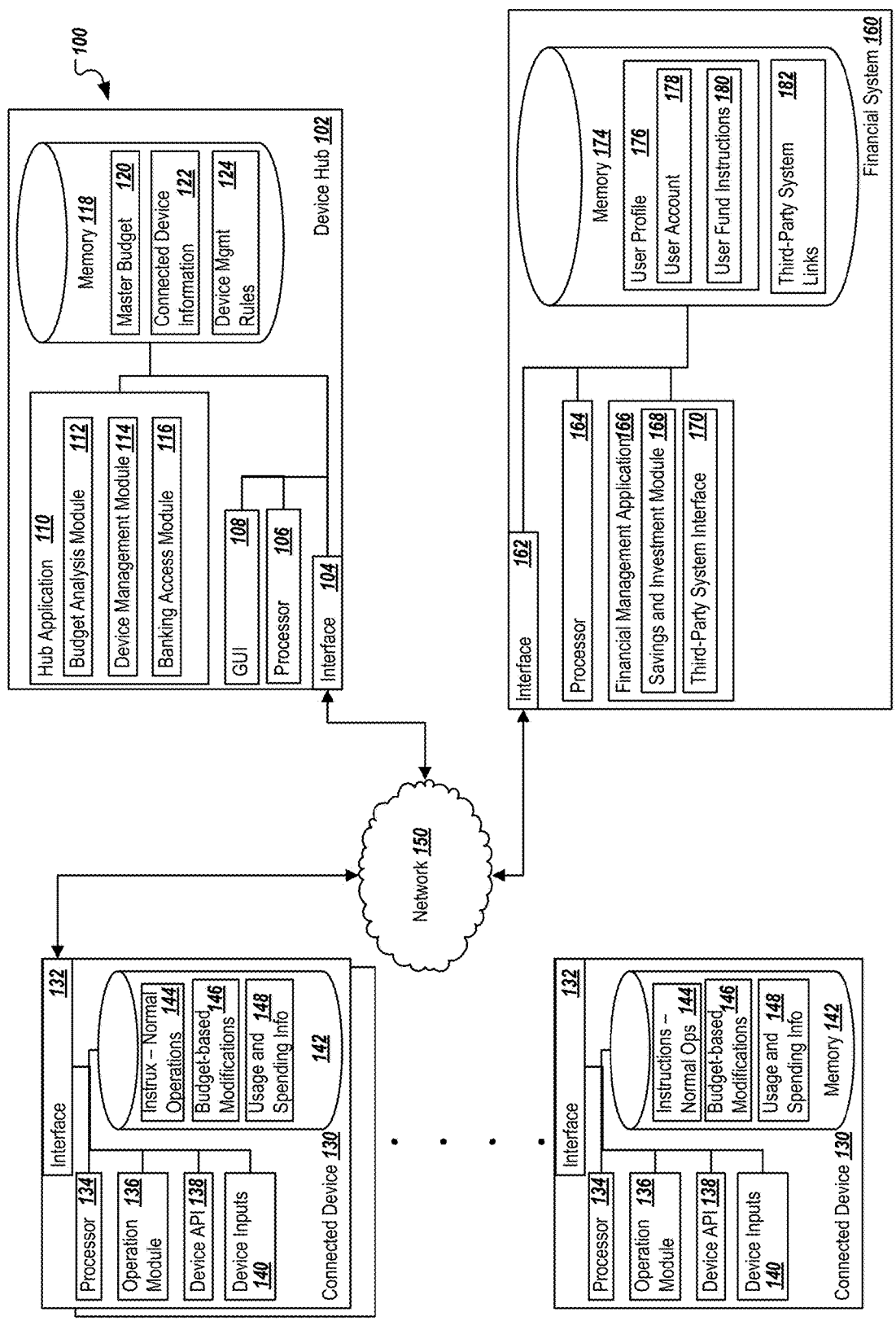
FIG. 1 is a block diagram illustrating an example system for implementing and managing a resource allocation, including adjusting disbursement of the resource allocation based on information received from a plurality of network-connected devices.

The present disclosure describes systems and methods for implementing a resource allocation and adjusting resource usage and corresponding spending based on information received from a plurality of network-connected devices. Specifically, a centralized network hub or hub module and managed resource allocation allow "smart" devices to be used in a home, office, or other location to manage spending, modify device operations, and save and/or invest the amount saved through use of the disclosed budgeting processes.

Advancements in home automation and network-connected devices are leading to new interactions and strategies for managing devices and costs associated with them, such as power consumption. The present disclosure and the tools described herein seek to combine a household or business's resource allocation with network-connected devices to drive device actions within financial constraints. In some instances, users can grant various permission levels for autonomous or semi-autonomous operations that allow modifications to be made to a first device in light of power consumption or usage of a different, second device. Additionally, device interactions can be used to drive budget parameters and projections.

In the present solution, the master resource allocation, or budget, is used as a master controller for multiple network-connected devices. In some instances, the master resource allocation and the various interactions can be managed from a network hub device, such as a smartphone, tablet, personal computer, or other similar components. In other instances, a centralized or cloud-based solution can be used. In any instance, component usage and/or spend data can be collected and compared to the master budget. In response to the comparison, different types of budgetary and device actions can be determined and taken. These tools allows previously unrelated and disconnected network-connected devices to be aligned towards a common goal, the financial budget of the household or business. In some instances, the network hub device may be a part of, embedded within, or otherwise implemented or operated within a particular connected device being monitored. Alternatively, the hub device may be separate from and external to any particular connected device.

Additionally, financial objectives could be modified via manual interactions with particular network-connected devices based on suggestions originating from the master resource allocation. For example, a message stating "Agreeing to reduce the temperature by 3 degrees permanently will save $3000 towards your retirement" could be displayed on the thermostat or at a user device, including the network hub. In response to a manual agreement to the change, the master resource allocation and the operational parameters of the particular network-connected device can be modified to reflect the change. In essence, the master resource allocation can become a governor of the operations of a plurality of network-connected devices. The user can set particular parameters into the master resource allocation, such as preventing the thermostat to be set less than 65 degrees and no higher than 75 degrees. Further, additional data sources (e.g., additional sensors, third-party input, and other information) can be used to enhance the master resource allocation and operational parameters, such as identifying warmer weather and allowing the thermostat to rely less on the heater by setting the lower end of allowable temperatures to a higher level and/or changing the scheduled heating schedule of the thermostat. Still further, devices outside of the home or office (e.g., wearables, vehicles, etc.) can be used in an extended implementation.

Turning to the illustrated embodiment, FIG. 1 is a block diagram illustrating an example system 100 implementing a resource allocation, referred to in FIG. 1 as the master budget, and adjusting spending via modified connected device operations based on information received from a plurality of network-connected devices. As illustrated in FIG. 1, system 100 is a client-server and device-client system capable of sharing device information across a set of connected devices 130 to a device hub 102, where both the device hub 102 and connected devices 130 may interact with a financial system 160. Specifically, system 100 includes or is communicably coupled with the financial system 160, device hub 102, a plurality of connected devices 130, and network 150. Although components are shown individually, in some implementations, functionality of two or more components, systems, or servers may be provided by a single component, system, or server. Similarly, in some implementations, the functionality of one illustrated component, system, or server may be provided by multiple components, systems, servers, or combinations thereof. Conversely, multiple components may be combined into a single component, system, or server, where appropriate.

As used in the present disclosure, the term "computer" is intended to encompass any suitable processing device. For example, financial system 160 may be any computer or processing device such as, for example, a blade server, general-purpose personal computer (PC), Mac®, workstation, UNIX-based workstation, or any other suitable device. Moreover, although FIG. 1 illustrates a financial system 160, financial system 160 can be implemented using two or more systems, as well as computers other than servers, including a server pool. In other words, the present disclosure contemplates computers other than general purpose computers, as well as computers without conventional operating systems. Similarly, each of the connected devices 130 may be considered computers, including functionality and operations specific to the individual device (e.g., a thermostat, security system, water heater, etc.), while the device hub 102 may be a smartphone, tablet, laptop computer, or any other suitable device. Further, illustrated financial system 160, device hub 102, and the plurality of connected devices 130 may each be adapted to execute any operating system, including Linux, UNIX, Windows, Mac OS®, Java™, Android™, or iOS. According to one implementation, the illustrated systems may also include or be communicably coupled with a communication server, an e-mail server, a web server, a caching server, a streaming data server, and/or other suitable server or computer.

In general, the device hub 102 is used to manage, interact with, and otherwise maintain the plurality of connected devices 130 while interacting with the financial system 160 in light of collected data throughout the system. The device hub 102 as illustrated in FIG. 1 contemplates a mobile device, although the device hub 102 may be a relatively stationary device (e.g., a desktop computer), or may be a client for a web- or cloud-based application. The device hub 102 can perform many of the operations directly at the device, while some operations may be performed remotely. The device hub 102 may be a dedicated device associated with the master resource allocation, while in other instances, the device hub 102 may be considered the device hub 102 due to a particular hub application 110 being executed at the device hub 102 that is used to intelligently manage the connected devices 130 and the master resource allocation 120.

As illustrated, the device hub 102 includes an interface 104, a processor 106, a hub application 110, and memory 118. In general, the device hub 102 is a simplified representation of one or more devices that allow a plurality of network-connected devices 130 to be managed in light of a master resource allocation 120. The device hub 102 may connect directly to the other connected devices 130 via a wireless or wired technology (e.g., via network 150, Bluetooth, Near-Field Communications (NFC), etc.), or the device hub 102 may contact one or more application programming interfaces (APIs) associated with one or more of the connected devices 130. In those instances, particular connected devices 130 may send information associated with their operation to another system, location, or service. The hub device 102, through its functionality, can then connect to those other systems, locations, or services to receive and identify usage and operational information regarding those connected devices. Similarly, the device hub 102 can provide instructions to the connected devices 130 either directly via network 150 or through the intermediate connections as described. In some instances, the device hub 102 may also be a connected device 130 such that the device hub 102's operations are considered and used in interacting with and managing the master resource allocation 120

The interface 104 is used by the device hub 102 for communicating with other systems in a distributed environment—including within the environment 100—connected to the network 150, e.g., connected devices 130 and/or financial system 160, and other systems communicably coupled to the network 150. Generally, the interface 104 comprises logic encoded in software and/or hardware in a suitable combination and operable to communicate with the network 150. More specifically, the interface 104 may comprise software supporting one or more communication protocols associated with communications such that the network 150 or interface's hardware is operable to communicate physical signals within and outside of the illustrated environment 100. Still further, the interface 104 may allow the device hub 102 to create ad hoc or dedicated connections to one or more of the connected devices 130.

As illustrated in FIG. 1, the device hub 102 includes a processor 106. Although illustrated as a single processor 106 in FIG. 1, two or more processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the device hub 102. Specifically, the processor 106 executes the algorithms and operations described in the illustrated figures, including the operations performing the functionality associated with the device hub 102 generally, as well as the various software modules (e.g., the hub application 110), including the functionality for sending communications to and receiving transmissions from the connected devices 130 and the financial system 160.

The illustrated device hub 102 also includes memory 118, or multiple memories 118. The memory 118 may include any memory or database module and may take the form of volatile or non-volatile memory including, without limitation, magnetic media, optical media, random access memory (RAM), read-only memory (ROM), removable media, or any other suitable local or remote memory component. The memory 118 may store various objects or data, including financial data, user information, administrative settings, password information, caches, applications, backup data, repositories storing business and/or dynamic information, and any other appropriate information including any parameters, variables, algorithms, instructions, rules, constraints, or references thereto associated with the purposes of the device hub 102. Additionally, the memory 118 may store any other appropriate data, such as VPN applications, firmware logs and policies, firewall policies, a security or access log, print or other reporting files, as well as others. For example, memory 118 can store the master budget 120, connected device information 122, and device management rules 124.

The master budget 120 represents a defined budget used to actively manage the operations of a plurality of connected devices 130 in such a way as to maintain budgetary requirements through operational modifications to one or more of the connected devices 130 in response to usage information associated with at least one of the connected devices 130. The master budget 120 may be a user-defined budget, an automatically-defined budget based on usage history or a default usage amount, or a combination thereof. The master budget 120 may be updated after continued usage of the tools described herein, such that auto- and/or manual-adjustments can be made, as appropriate. In one example, the master budget 120 can define a monthly budget for home operations, such as electricity, gas, water, phone, television, and other utilities and services. Each of the budget entries may be associated with one or more connected devices 130, such as a thermostat, shower, refrigerator, phone, etc. The device hub 102, upon establishment of the master budget 120, can connect to data sources associated with each of those connected devices 130 (e.g., the devices themselves or a data source where device information is published), as well as channels to send information and operational instructions back to the connected devices. The set of connected device information 122 can store and define connection information to each of the connected devices 130, information on the devices 130 themselves, and/or specific information related to the operation of and/or unique features or each device 130. For example, if two or more thermostats are available in a house, one of the thermostats may be defined as a master thermostat, or may be identified as including a GUI capable of delivering messages to users. If a rule requires a user to be contacted via the device, the message may only be sent to the master thermostat having the GUI or display. Similarly, the connected device information 122 may define particular device APIs or addresses at which instructions and messages can be sent back to the devices 130. Memory 118 also include a set of device management rules 124. The device hub 102 (and specifically, the hub application 110) can use received usage and spending information from various ones of the plurality of connected devices to compare those values to the budget 120 and, subsequently, identify one or more rules (from a set of device management rules 124) to perform and enforce.

The various device management rules 124 can represent a set of logic-based rules for maintaining the master budget 120. The device management rules 124 may be a default set of rules or a customized rule set. The rules may prioritize device usage and/or operations, providing various alternatives, modifications, and permutations of operations to be performed in response to particular actions from one or more of the connected devices 130. In some instances, the priorities may be defined by a user associated with the device hub 102 and/or the environment 100. For example, a user may prioritize the temperature of a home to have a higher priority than the brightness of an adjustable light. In instances where a particular connected device 130 has been used more than budgeted, the device management rules 124 may cause the adjustable light to be dimmed before changing the temperature of the thermostat. The priorities of the device management rules 124 may include a hierarchy or priority of rules and/or devices as defined by the customer. For example, a particular customer may value warmth via a heating system over water temperature. By setting the heater to a higher priority, the device management rules 124, when executed and used, may determine that a water heater's temperature be reduced prior to a reduction in temperature via the thermostat. In a hierarchical rule set, different sets of devices may be prioritized at different levels, where a device at a relatively lower level will be more likely to be associated with operational modifications than a device at a relatively higher level in the hierarchy. By preparing the prioritized or hierarchical device listing, the customer can define what devices and operations are most important to them, such that the master budget 120 and device hub 102 the priority information into consideration when performing their budget management operations.

In some implementations, each device associated with the master budget can be individually monitored and incorporated into the master budget 120. Additionally, the master budget 120 may include one or more sub-budgets or budget categories in which particular related devices can be combined for budgeting purposes. This grouping can allow customers to manage budgets for related costs, utilities, and general categories. For example, items that use or influence a particular utility bill or resource in common may be grouped, such as a gas oven, gas water heater, and gas heating system. These devices may all be combined into a particular budget category, such that if a decision is made to reduce spending associated with a gas utility bill, decisions as to which of the gas-related devices to modify can be made. Because some devices use two or more types of utility or represent shared costs with different types of devices, a single device may be associated with multiple budget categories. For example, the gas water heater may be associated with both a water budget category and a gas budget category. In some instances, to maintain a particular budget category, operational adjustments can be made to devices associated within the budget category. For example, if both bathroom lighting and shower temperature are in the same category, a relatively long shower may cause certain lights to be dimmed after a budgeted amount of hot water usage is met. Such adjustments can be performed inter- and intra-budget categories, thereby managing the budget to a customer's particular usage.

The budget and usage of certain network-connected devices may be associated with set limits to prevent reducing or increasing spending above those limits. For example, if a determination is made based on the master budget 120 and current spending to reduce a thermostat, the set limits may prevent the thermostat from reducing or increasing the set temperature past certain set limit. These set limits may be default values, values identified based on a location of the managed residence or business (e.g., current or expected weather at the location), or customer-defined values, among others. In instances where an operational rule or adjustment is determined to be made to a device that would cause that device to exceed its set limit, alternative operational modifications to that device or another device may be substituted after further consideration by the master budget 120 and the device hub 102.

Based on minimum settings and set limits for particular devices, the master budget 120 may be limited to a lower bound at which no further reductions can be made. In such instances, a global minimum budget based on the lower bounds of each device can be used to identify the minimum master budget 120 possible. Attempts to reduce particular portions of the budget below any of these minimum amounts may cause a notification to be sent to the customer (e.g., from and/or via the device hub 102) that would indicate such requested reductions were not available. If the proposed modification was to a specific network-connected device 130, an alternative operational modification for a different device may be suggested. In some instances, the alternative operational modification may be to another device within the same budget category as the specific device.

As noted, the device hub 102 includes the hub application 110. The hub application 110 represents an application, set of applications, software, software modules, or combination of software and hardware used to manage the master budget 120 and operations of the plurality of connected devices 130. In the present solution, the hub application 110, via the operations of the device hub 102, can determine usage or spending information associated with one or more of the plurality of connected devices 130 and adjust operations of at least one of the connected devices 130 in response. In some instances, the hub application 110 may request or cause adjustment of a connected device 130 based on that connected device's own usage information. In other instances, in response to receiving information on a first connected device 130, the hub application 110 may cause operational changes to one or more connected devices 130 other than the first connected device 130. In some instances, each master budget 120 may be associated with a period of time or events. At the end of each period, a determination can be made as to whether the total spending associated with the master budget 120 has been exceeded or whether additional funds are available. If additional funds are available, the hub application 110 can cause the excess and unspent funds to be transferred from a user account 178 at the financial system 160 to one or more savings accounts and/or investment funds. As illustrated, the hub application 110 includes a budget analysis module 112, a device management module 114, and a banking access module 116. Additional modules and functionality may be included in alternative implementations. In some implementations, instead of saving or investing funds into an account, at least a portion of the excess and unspent funds may be redistributed into the master budget 120 itself, allowing for additional spending in particular areas of the budget. For example, after a budget period where excess funds remain, customers may choose, for future budgetary periods, to place their thermostat at a more comfortable temperature without the need to modify the operations of another connected device. Alternatively, any set limits to particular devices may be changed to a less strict amount, rules may be modified to allow a wider (or narrower) range of operational modifications for particular devices. The additional spending can be used for future periods of the same budget item or the excess amounts can be used for other budget items. For example, if gas usage was low in a first budgetary period, the excess could be allocated to: 1) savings/investing; 2) a rollover to the next period for increased allowed budget of gas usage; or 3) distributed to cover a water budget overage (either in the current first budgetary period or in future budgetary periods).

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

The illustrated modules of the hub application 110 may be combined into a single application or module in some instances. The budget analysis module 112 can request, receive, locate, and otherwise interpret usage and spending information received from or associated with the plurality of connected devices 130. Additionally, the budget analysis module 112 can compare the received or identified information with the master budget 120 to determine relative amounts of usage or spending as compared to previously budgeted amounts. Using that information, the budget analysis module 112 can pass the results to a device management module 114.

The device management module 114 can determine, based on the device management rules 124, one or more actions to be taken with regard to the plurality of connected devices 130. In some instances, instructions to perform a particular action at a particular connected device 130 or set of devices 130 may be identified and transmitted to the appropriate device(s) 130. The hub application 110 can use the interface 104 to communicate with the devices 130.

The banking access module 116 provides a set of financial functionality associated with the hub application 110. The banking access module 116 can correspond with the financial system 160 and link the device hub 102 to a particular user profile 176, in turn associated with one or more user accounts 178. The banking access module 116 may also be used to interact with, define, and modify one or more instructions 180 related to user funds and accounts. When the amount spent over a period is less than a budgeted amount, the banking access module 116 can identify the excess funds and interact with the financial system 160 to move at least a portion of the excess funds to accounts identified by the user using the user fund instructions 180.

Device hub 102 can also include a graphical user interface (GUI) 108. The GUI 108 interfaces with at least a portion of the environment 100 for any suitable purpose, including generating a visual representation of a web browser and/or the hub application 110. In particular, the GUI 108 may be used to view and navigate various web pages or application functionality located both internally and externally to environment 100, as well as to view and navigate through information accessed by the hub application 110, such as information stored at or associated with the financial system 160 and/or one or more of the connected devices 130. Generally, the GUI 108 provides the particular user with an efficient and user-friendly presentation of data provided by or communicated within the system. The GUI 108 may comprise a plurality of customizable frames or views having interactive fields, pull-down lists, and buttons operated by the user. For example, the GUI 108 may provide interactive elements that allow a user to view or interact with the master budget 120, operations of the one or more connected devices 130, or fund instructions 180 associated with user accounts 178 at the financial system 160. The GUI 108 may present information associated with the hub application 110 for viewing and interaction. In general, the GUI 108 is often configurable, supports a combination of tables and graphs (bar, line, pie, status dials, etc.), and is able to allow users to modify instructions, parameters, and settings associated with the hub application 110. Therefore, the GUI 108 contemplates any suitable graphical user interface, such as a combination of a generic web browser, intelligent engine, and command line interface (CLI) that processes information in the platform and efficiently presents the results to the user visually.

The illustrated device hub 102 is intended to encompass any computing device such as a desktop computer, laptop/notebook computer, mobile device, smartphone, personal data assistant (PDA), tablet computing device, one or more processors within these devices, or any other suitable processing device. For example, the device hub 102 may comprise a computer that includes an input device, such as a keypad, touch screen, or other device that can accept user information, and an output device that conveys information associated with the operation of the hub application 110 or the device hub 102 itself, including digital data, visual information, or a GUI 108, as shown with respect to the device hub 102.

As illustrated, the device hub 102 illustrates a single device or component including the full hub application 110 and its related functionality. In other implementations, some or all of the illustrated device hub 102 may be located in or associated with one or more other components, as well as components and/or locations not shown in FIG. 1. For example, the device hub 102 may be a cloud-based component or application. The device hub 102 can manage the master budget 120 and the associated rules 124, issuing instructions to the connected devices 130 directly or to a particular device within or associated with the plurality of network-connected devices 130. Restated, some or all of the operations currently illustrated with the device hub 102 may be moved or located at a remote location, including a cloud-based solution. Logic for managing the master budget 120 and determining one or more operational modifications may be managed at the remote or cloud-based location(s). One or more of the connected devices 130 and/or a portion of the illustrated device hub 102 may retain functionality for receiving the instructions from the remote and/or cloud-based solution and relaying those instructions to particular connected devices 130 with which the instructions are associated. In that example, a local device (either a stand-alone device or one of the connected devices 130) may retain the described device management module 114, while the remote or cloud-based solution may manage the other portions of the hub application 110. The connected devices 130 may also use the local device to access and interact with the master budget controller and other logic located at the remote and/or cloud-based solution. In some implementations, the hub application 110 or at least a portion thereof may be managed by and/or executed at the financial system 160. In the cloud-based solution, a corresponding web application and/or mobile app may be used to set and modify operational settings related to the master budget 120. Any suitable combination for managing the master budget 120 to maintain the budget and modify operations of one or more connected devices 130 is contemplated in this disclosure.

The plurality of connected devices 130 may include many different device types, each of which are capable of interacting—either directly or indirectly—with the device hub 102. The connected device 130 illustrated in FIG. 1 is an example of one of any number of variations of connected devices 130, and is meant to be an example device. Alternative, additional, or different components may be associated with and/or included within different implementations.

As illustrated, connected device 130 includes an interface 132, a processor 134, and operation module 136, a device API 138, device inputs 140, and memory 142. The interface 132 and processor 134 may be similar to those of the device hub 102, or they may be different. In general, interface 132 allows each connected device 130 to interact with the device hub 102. In some instances, interface 132 may allow the connected device 130 to directly connect to the device hub 102 either through network 150 or, alternatively, via direct communications with the device hub 102. Processor 134 allows the connected device 130 to execute its base functionality as well as to perform any suitable "intelligent" operations, such as sharing usage and spending information with the device hub 102 and/or receiving instructions to automatically and/or manually modify operations of the connected device 130. The operation module 136 is any application defining and performing the operations associated with the connected device 130. The operation module 136 uses normal operating instructions 144 to perform the standard operations of the device 130 and can provide or make available a set of usage and/or spending information 148. The usage information 148 can track or monitor information based on the usage of the connected device 130, with such information either being made available to the device hub 102 (e.g., via device API 138) or being transmitted to the device hub 102. The device hub 102 can then use that information to compare against the master budget 120 and identify operational adjustments to be made, if any, to one or more connected devices 130.

Some connected devices 130 may have their own GUI or display (not shown in FIG. 1). In instances where the instructions are received from the hub application 110 at the connected device 130, the display can provide information as to either suggested manual operational adjustments or information on automatic operational adjustments that may have been made. Users can modify the behavior of the connected device 130 by using existing device inputs 140, such as buttons or other controls available to users. Where a manual operational adjustment is received at the connected device 130 with information on the adjustment presented via the display, the user can actuate the modification using the device inputs 140 as appropriate. In some instances, operational adjustments may be automatic, but may require approval from the user prior to implementing said changes. The approval to make the changes may be presented at the connected device 130 itself, the device hub 102, or at a separate application on any suitable device (e.g., via a smartphone, email application, or web-based hub application, among others).

Memory 142 may be similar to or different than memory 118. As described, memory 142 includes the normal operation instructions 144 and the usage and/or spending information 148. Additionally, memory 142 may include budget-based modification instructions 146. The budget-based modification instructions 146 may be used where specific instructions are not provided by the device hub 102, but instead where information related to budget-based performance is provided. The budget-based modification instructions 146 allow the connected device 130 to intelligently modify its operations based on the budget performance before or in lieu of instructions received from the device hub 102.

As previously noted, each connected device 130 may be different or include different options. In general, the connected devices 130 represent normal appliances, components, or things within a connected environment 100 that can also provide enhanced, intelligent decision-making and/or that can be instructed to modify their behavior in response to an outside influence, such as the hub application 110.

The illustrated financial system 160 represent a system performing financial operations in response to budget analyses performed at the device hub 102. In some instances, the master budget 120 may be maintained at the financial system 160, with information from the various devices 130 being used there to determine operational modifications to be performed. As illustrated in FIG. 1, however, the financial system 160 receives information on budget performance from the device hub 102 to perform particular actions with funds remaining in the budget after periodic analyses. In some instances, the financial institution 160 may provide the hub application 110, or alternatively, operations of the device hub 102 may be performed by the financial system 160.

The financial system 160 includes interface 162, processor 164, financial management application 166, and memory 174. Interface 162 and processor 164 may be similar to or different from interfaces 104, 132 and processors 106, 134. Processor 164 executes the financial management application 166, which performs financial operations in response to the budget performance. The financial management application 166 can associate particular device hubs 102 with specific user profiles 176. Each user profile 176 may be associated with one or more user accounts 178 and a set of user fund instructions 180. Based on the budgetary performance reported by the device hub 102, the financial management application 166 can determine the actions to be taken based on the user fund instructions. In some instances, the user fund instructions 180 may define rules for how excess budget is to be spend or invested. In some cases, the instructions 180 may direct the financial management application 166 to deposit funds from a primary account associated with the master budget 120 (e.g., one of the user accounts 178) to transfer funds to one or more other user accounts 178. The other user accounts 178 may include a savings account, an investment account, a retirement account, or other suitable accounts. In some instances, excess budget may be applied to credit or debt accounts, such as credit card accounts, student loan accounts, home mortgage accounts, or any other suitable account. A savings and investment module 168 can manage the transfer of funds in many instances, such as when the financial system 160 is associated with a financial institution with whom the user holds an account. The financial institution can then implement the defined instructions 180 in response to identifying the excess funds. In some instances, the financial management application 166 may include a third-party system interface 170 for accessing and implementation financial operations associated with the budget performance. Third-party systems may include accounts other than those of the underlying financial institution associated with the financial system 160.

Memory 174 may be similar or different than either of memory 118 and memory 142. As described, memory 174 includes the user profile 176 as well as third-party system links 182. The third-party system links 182 can provide access information for one or more third-party accounts defined in the user fund instructions 180, and can be used by the third-party system interface 170 to perform the investments or savings as defined by the user.

While portions of the software elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
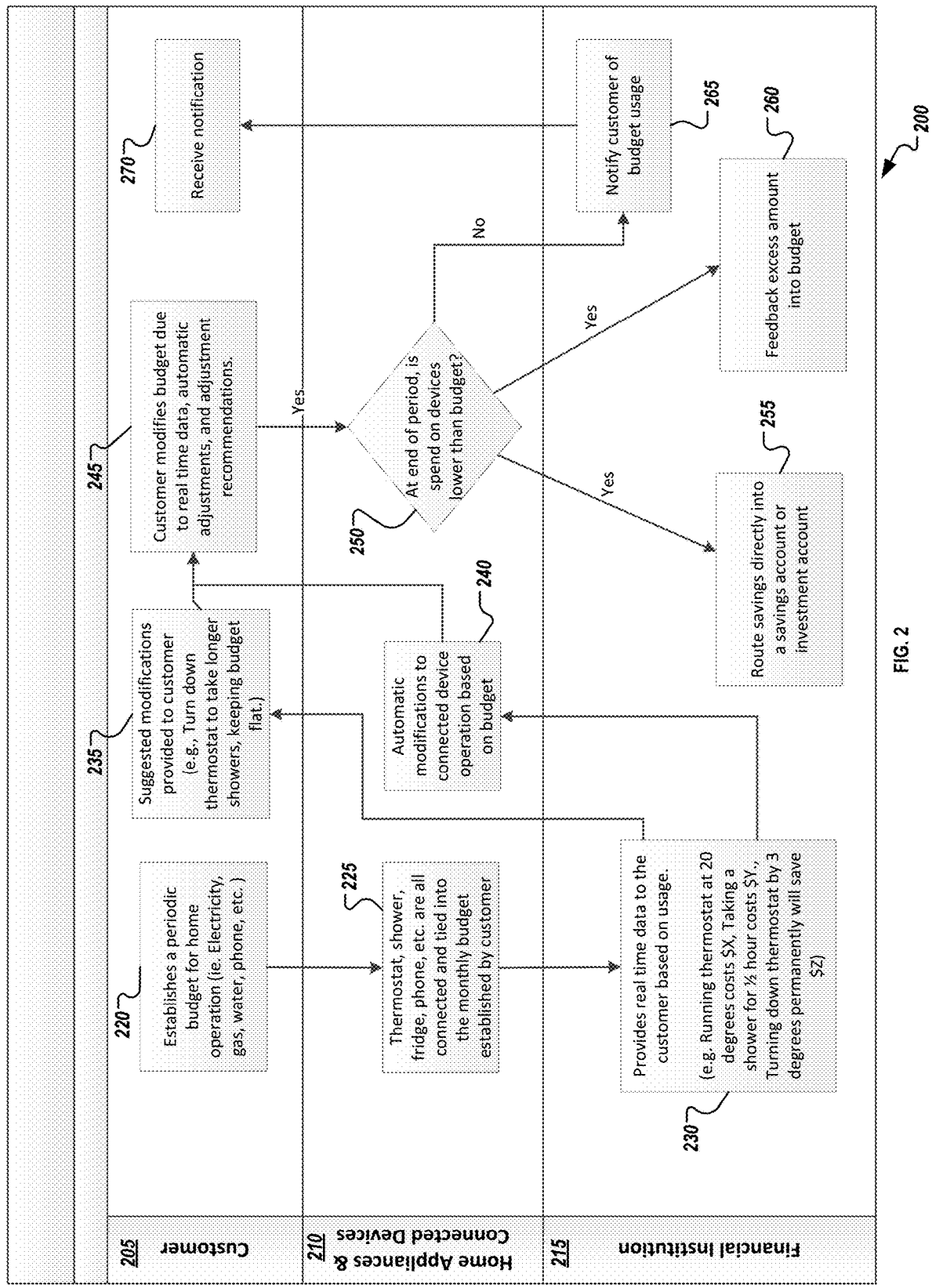
FIG. 2 is a swim-lane diagram illustrating example operations related to implementing and managing a resource allocation and automatically allocating remaining funds to a savings or investment account.

FIG. 2 is a swim-lane diagram illustrating example operations related to implementing and managing a resource allocation and automatically allocating remaining funds to a savings or investment account. Herein, the resource allocation may be referred to as a budget. For clarity of presentation, the description that follows generally describes method 200 in the context of the system 100 illustrated in FIG. 1. However, it will be understood that method 200 may be performed, for example, by any other suitable system, environment, software, and hardware, or a combination of systems, environments, software, and hardware as appropriate.

FIG. 2 describes an example set of operations across three actors, a customer 205, a plurality of home appliances and connected devices 210, and a financial institution 215. Although described in a particular layer, some of the operations may occur at a different layer in particular implementations. Alternatively, some of the operations may occur at multiple layers in other implementations, such that an illustrated operation occurs in multiple steps or actions at two or more layers. Further, in the illustrated example of FIG. 2, the financial institution 215 may directly provide instructions to the home appliances and connected devices 210 and/or the customer 205. The financial institution 215 may manage the analysis and instruction determinations at a device hub (e.g., device hub 102 from FIG. 1), or the analysis and instructions determinations may be made remotely at the financial institution 215.

At 220, a customer 205 can establish a periodic (e.g., a daily, weekly, monthly, or any suitable period) resource allocation, or budget for home operations, including, for example, electricity, gas, water, and phone operations. Each of those home operations may be connected to one or more devices or appliances 210, each of those home appliances and devices 210 able to provide information on their usage and/or spending and to receive suggested and/or automated operational modifications from a device hub or the financial institution 215.

Once the budget is set, the various home applications and devices 210 are connected to the monthly budget established by the customer 205 at 225. The devices 210 may be individually programmed with specific instructions on how and where to communicate. For example, the devices 210 may be programmed to communicate with a particular device hub (e.g., device hub 102), the financial institution 215, or a website or other location. The communication instructions may allow for two-way (or multi-way) communications so that the financial institution 215 and/or a device hub may provide instructions to the devices 210, where appropriate. In some instances, one or more of the devices 210 may be connected to one or more different ones of the devices 210 such that operations of the one or more and different ones of the devices 210 are symbiotic or otherwise interrelated.

At 230, the financial institution 215 can provide real-time data to the customer 205 based on the usage and/or spending associated with the usage of the various devices 210. The real-time data can include general suggestions without specific reference to the budget, or specific recommendations for modifying operations of one or more of the devices. The real-time data can include information about current operations of the devices 210 as well as suggestions to the customer 205 as to how funds could be saved, such as "running the thermostat at 70 degrees costs $X," "taking a ½ hour shower costs $Y," and "reducing the thermostat by 3 degrees permanently will save $Z.") The financial institution 215 (or the hub device 102 of FIG. 1) can compare current usage to a budgeted amount to determine whether measures should be taken to manage and maintain the budget. In some instances and as described above, the financial institution 215 (or the hub device 102) may generate one or more suggested modifications and provide them to the customer 205 at 235. These suggestions can be presented at the devices 210 themselves or may be sent to a mobile device, inbox, or other suitable location for the customer 205 to review and, if agreed, implement. Alternatively, the financial institution 215 (or the hub device 102) can provide instructions to the devices 210 directly to perform automatic operational modifications to bring the master budget into a maintained order, where those devices 210 can perform the automated operational modifications at 240.

Upon the modifications, the customer can reduce their budget based on the real-time data, the automatic adjustments, and the suggested adjustment recommendations at 245. In some instances, the budgeted amounts may stay the same, while the amount actually spend is lowered.

At the end of each budgetary period, a determination as to whether a total spend on the devices 210 is lower than the spending budgeted in the master budget is made at 250. As noted, budgetary periods may be any suitable period of time, including hourly, daily, monthly, or other time periods. In some instances, usage information for particular devices 210 can be used to calculate a spent amount if bills or spending amounts are not readily available. If the total actual spend is less than the budgeted spending, the financial institution 215 can route, at 255, at least a portion of the budget savings from a designated account associated with the master budget directly to a savings or investment account of the customer 205. In some instances, the customer 205 may have provided instructions on how particular funds are to be deposited or invested, including moving the funds into two or more accounts, including accounts outside of the financial institution 215. In other alternatives, some or all of the excess funds after a budgetary period may be fed back into the budget to provide a budgetary cushion for the next period, or some or all of the excess funds may be used to loosen the budget by reducing set limits on one or more of the connected devices. In doing so, the excess funds may be used to make the next budgetary period more comfortable for the customer by reducing the operational adjustments suggested and/or made by the system moving forward. In some alternatives, a specific savings amount goal may be identified prior to a budgetary period. In those instances, the system can track and modify activities in order to meet the savings amount goal.

When a determination is made that the actual spending is higher than the budgeted amount, the financial institution 215 or hub device 102 notifies the customer 205 of the over-budget usage at 265. The notification may include, among other items, recommendations for operational modifications, a request to modify the budget for the next period, for authorization to allow additional automatic modifications throughout the budgetary period. At 270, the customer 205 can receive the notification (from 265) and accept or act upon some, none, or all of the information within the received notification.

Figure 3:
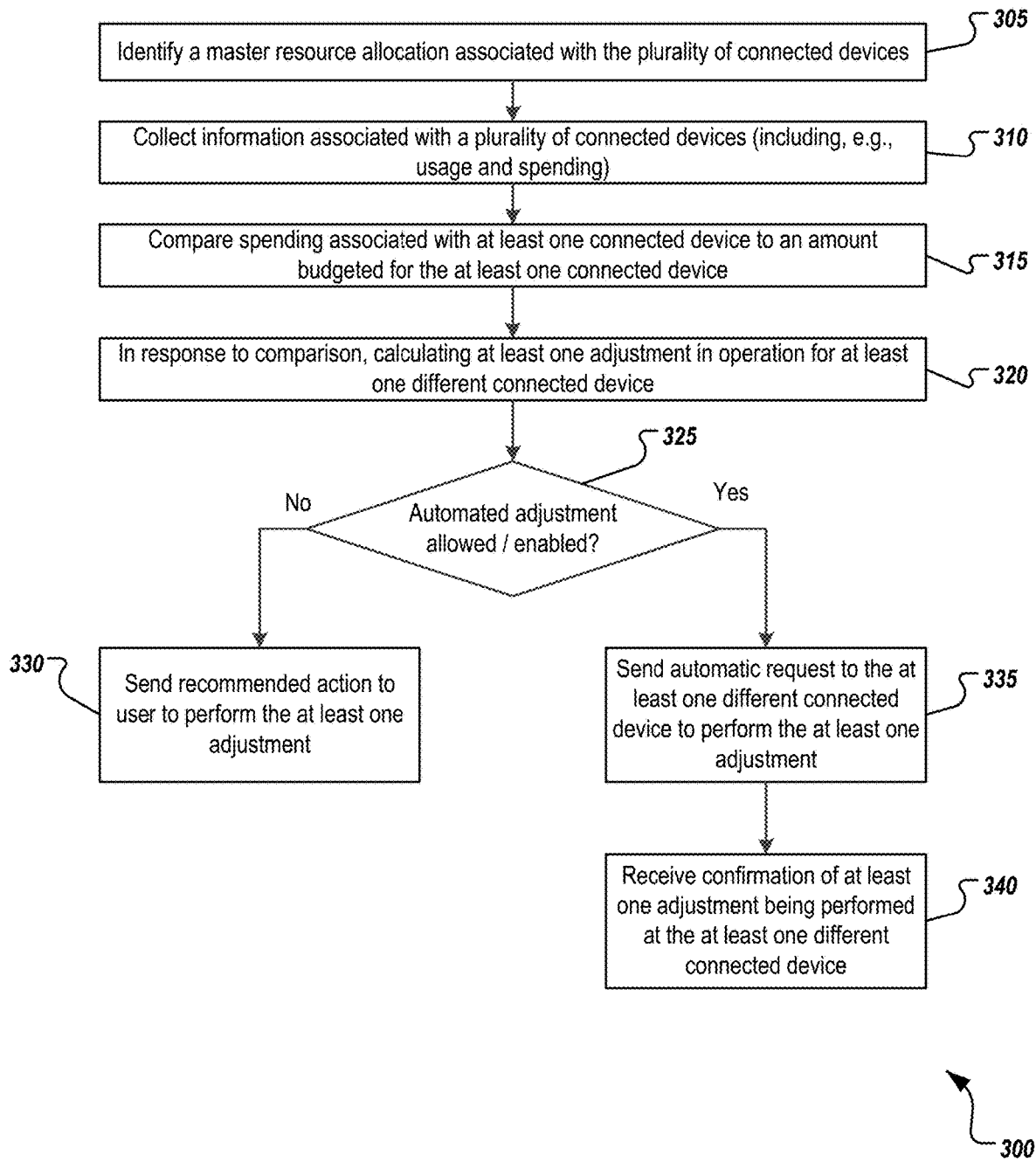
FIG. 3 is a flowchart of an example operation for using a master resource allocation to compare actions performed by one or more network-connected devices and adjusting operations of at least one other network-connected devices based thereon.

FIG. 3 is a flowchart of an example operation for using a master resource allocation to compare actions performed by one or more network-connected devices and adjusting operations of at least one other network-connected devices based thereon. For clarity of presentation, the description that follows generally describes method 300 in the context of the system 100 illustrated in FIG. 1. However, it will be understood that method 300 may be performed, for example, by any other suitable system, environment, software, and hardware, or a combination of systems, environments, software, and hardware as appropriate.

At 305, a master budget associated with a plurality of connected devices is identified. The master budget may be managed at a device hub or mobile device executing an application specifically developed to interact with the plurality of connected devices. Alternatively, the master resource allocation may be maintained at a financial institution of a customer associated with the master resource allocation. The master resource allocation can identify various budgeted bills, activities, or actions associated with the operation of various connected devices. Further, the connected devices are able to share or make available information on the devices' usage and associated costs. In some instances, the devices may determine the costs associated with their operation, while in others, the devices may only provide their usage amounts. For example, a smart thermostat may be able to determine the current outside temperature, the number of hours the air conditioner and/or heater were running, and the temperature to which the thermostat was set. That information may be provided to a system interacting with the master resource allocation to determine the costs associated with those operations. In other instances, particular devices may be able to calculate actual or estimated energy costs based on an amount of power used multiplied by a given rate.

At 310, usage, costs, and spending information associated with at least some of the plurality of connected devices is collected. In some instances, the connected devices may provide such information directly to a device or application managing the master resource allocation. In others, the connected devices may provide that information to a third-party or defined repository, at which the device or application can access the information and use in its calculations.

At 315, the actual spending and costs associated with at least one connected device is compared to an amount budgeted for the at least one connected device. In some instances, the comparison may occur at regular intervals, such as each hour, each day, each week, etc. Alternatively, the comparison may instead occur in response to events, such as when a certain amount of spending associated with the at least one connected device is reached. The amount may be 25%, 50%, or 75% of the budgeted amount, which may happen at an unexpected time or at a different time during a budgetary period than expected. For example, if spending for a particular connected device reaches 50% of the budgeted amount a week into a monthly budgetary period, one or more adjustments may need to be made.

At 320, at least one operational adjustment for one or more connected devices is calculated in response to the comparison. The at least one operational adjustment may be to operations of the at least one connected device for which spending exceeded the budgeted amount, or alternatively to another connected device among the plurality of connected devices. A defined rule set may be used to determine the appropriate actions to take or recommend in response to the over resource allocation usage of particular connected devices. By prioritizing devices, the rule sets may be able to modify the operations of a device of relatively lower importance or preference while maintaining preferred operational statuses of higher priority devices. Similarly, the rule set may define particular parameters for allowed changes, such as maximum adjustments to thermostat temperatures, water temperatures, relative lighting, and other suitable changes. Further, the rule set may define minimum allocations associated with individual devices, groups of devices, and/or the collective plurality of devices. Based on requirements of the living and/or working conditions of the household or business associated with the master resource allocation, minimum allocations for individual devices, related groups of devices, and/or all of the plurality of connected devices may be defined, where the minimum allocation equals the minimum cost of the amount needed to run the devices at their minimum required levels. These rule sets may be defined and updated by users, or they may be default settings associated with the devices or scenario. The rule sets may also determine whether calculated operational adjustments are allowed to be performed automatically or if suggestions must be passed to the customer before their implementation. The rule set can determine what is allowed automatically and what requires customer approval and/or customer action.

At 325, a determination is made as to whether an automated adjustment is allowed and/or enabled. In some instances, particular connected devices may not be able to automatically modify operations, instead requiring the customer to manually perform the action. Additionally, customers may limit via the rule set which adjustment can be performed automatically and which are not.

In response to a determination that automated adjustments are not allowed or enabled, method 300 continues at 330 where the recommended action is sent to the customer suggesting that the at least one adjustment is performed. The suggestion may be sent to a display on the particular connected device associated with the adjustment, to another device used by the customer, such as a smartphone or tablet via a notification, or via email or other messaging technology. The customer can then choose whether to accept or reject the change, either by activating a corresponding button or menu item through the presentation (and thereby authorizing the operational adjustment), or by manually using inputs on the corresponding connected device to make the change. In some instances, the customer may choose to perform a partial adjustment, such as changing the thermostat by 2 degrees instead of the suggested 3 degrees. Alternatively, if the user chooses not to perform the suggested change, method 300 may return to 320 to determine an alternative operational modification that could be made.

In response to a determination that an automated adjustment is allowed and enabled at the connected device(s) associated with the calculated operational modification, method 300 continues at 335. At 335, a request to perform the automatic adjustment is sent to the connected device, which may be different than the connected device associated with the resource allocation overage. At 340, a confirmation that the at least one automatic adjustment is performed at the connected device is received. This confirmation can be reported back to the customer. In some instances, the customer may be given an opportunity to reverse the automatic modification.

Figure 4:
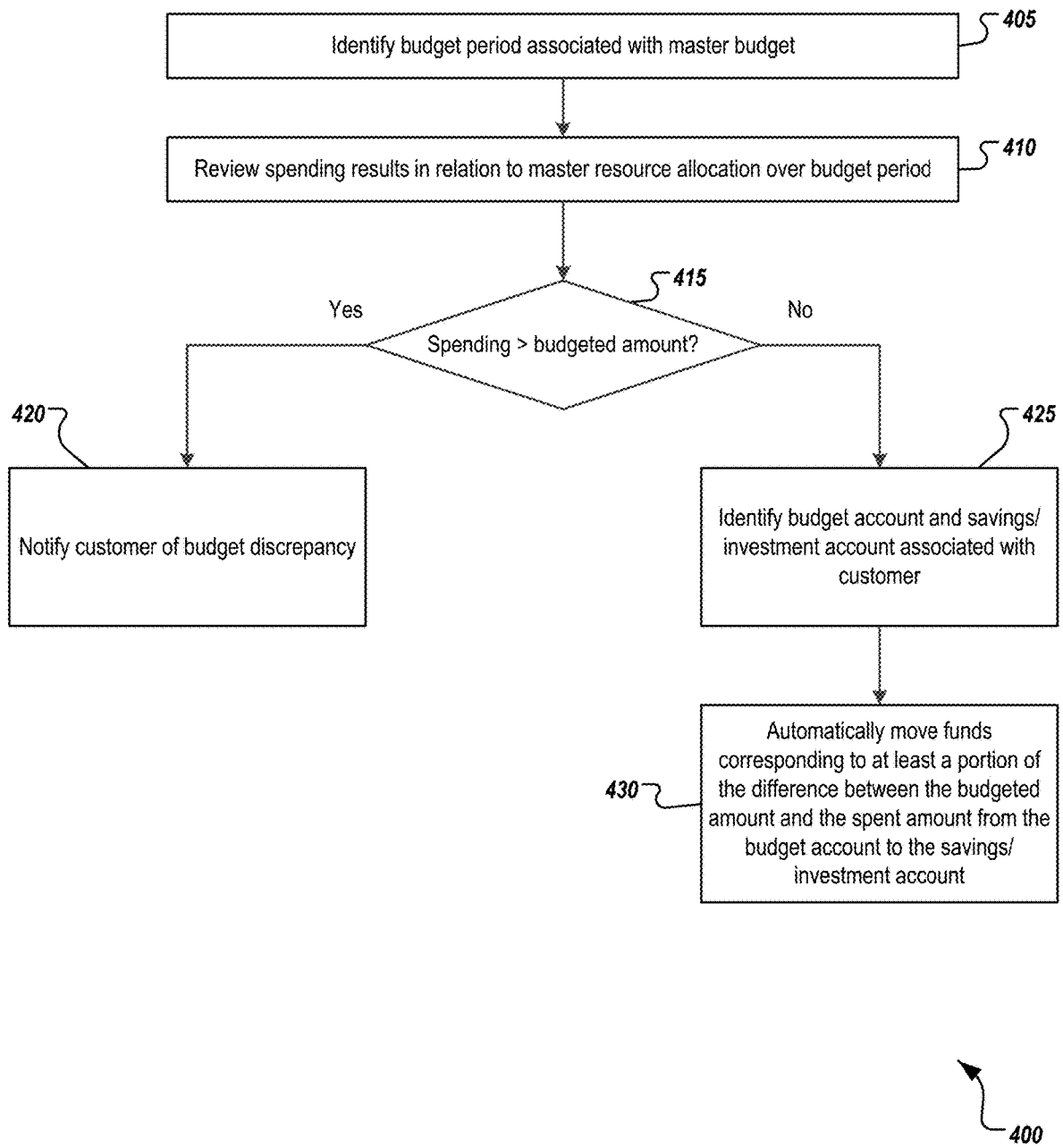
FIG. 4 is a flowchart of an example operation for automatically saving or investing excess funds remaining from a master resource allocation at the end of a period of time, where the funds to be saved or invested represent at least a portion of a difference between an actual spending amount and an expected spending amount associated with the resource allocation.

FIG. 4 is a flowchart of an example operation for automatically saving or investing excess funds remaining from a master resource allocation at the end of a budget period, where the funds to be saved or invested represent at least a portion of a difference between an actual spending amount and a budgeted spending amount. For clarity of presentation, the description that follows generally describes method 400 in the context of the system 100 illustrated in FIG. 1. However, it will be understood that method 400 may be performed, for example, by any other suitable system, environment, software, and hardware, or a combination of systems, environments, software, and hardware as appropriate.

At 405, a budget period associated with the master resource allocation is identified. The budget period may be a regular interval, such as week, month, or quarter. Alternatively, the budget period may be associated with particular events or occurrences. At 410, spending results for the plurality of connected devices are reviewed in relation to the master budget at the end of each budget period.

At 415, a determination is made as to whether the spending over the budget period is greater than the amount budgeted for the master resource allocation. If so, method 400 continues at 420, where a notification of the overage is provided to the customer indicating the budget discrepancy. In some cases, the notification can include one or more recommendations to reduce spending permanently, including actions and changes to settings associated with one or more of the connected devices.

If a determination is instead made that the spent amount is less than the allocated or budgeted amount, method 400 continues at 425. At 425, budget accounts (e.g., a checking account) and savings and/or investment accounts associated with the customer are identified. Additionally, one or more savings/investment rules are identified to determine how any excess funds are to be used. At 430, funds corresponding to at least a portion of the difference between the spent amount and budgeted amount can be moved to the identified savings and/or investment accounts according to the defined rules. Any suitable combination of savings and investments can be used, as well as fund transfers to non-savings and non-investment accounts, such as student loans, mortgage accounts, credit card accounts, or other suitable accounts. As described above, one alternative to moving funds to particular accounts may be to use some or all of the excess funds to provide a budgetary cushion for the next period, or to adjust settings within the master budget to a more comfortable level. For example, parameters for suggesting or making an operational adjustment to a thermostat may be lessened and/or made less reactive, allowing the temperature to stay at a lower temperature in the summer or a higher temperature in the winter as compared to previous months where the thermostat may be changed sooner in reaction to other device-related spending.

To manage and modify a master budget, an initial master resource allocation must be populated and used to perform an initial budgeting process. The initial generation of the master resource allocation can be time-consuming and difficult to manage, as the amount of usage from one or more connected devices may be difficult to determine, particularly prior to acquiring particular connected devices, or when moving into a new location that includes one or more connected devices that can be added to a master budget.

In one implementation, multiple potential sources of expected usage data, and therefore, estimated allocation amounts, can be used. In a first instance, device-level feedback may be available to users, such that historical information about the previous usage of a device may be available to a user in generating the initial master resource allocation. The historical information may be available to users where a connected device has been used in the past but not incorporated into a master resource allocation, such that usage information is available at the device itself or via a monitor associated with the device. In some instances, the historical information may be associated with the user's own use, while in other instances, the historical information may be associated with another person's use. In those instances, one or more connected devices may be acquired in the purchase of a home where the device stays with the home after purchase, such that usage information may be available. In other instances, a connected device may be purchased used, where at least some historical usage information may be available on the device or, for example, online and connected to the device or the device's serial number.

In another instance, in particular when one or more new devices are purchased or acquired, no such historical information may be available. The new devices, for example, may replace one or more existing non-connected devices for which historical information is not available. For new devices, or in any instance where no historical usage information is available, a solution may be realized where information about estimated usage for a person or persons similarly situated to the user and using the same or a similar device as the particular device being acquired may be used. For example, information related to usage of particular devices and device types may be gathered and used by manufacturers, energy providers, and other interested and authorized entities. The usage information may be associated with particular customers, where those customers are associated with a profile identifying personal information, such as the customer's age, family situation and/or household makeup (e.g., married, number of children, etc.), location, etc., along with an indication of particular device models and/or device types used by the person in their home. Usage information associated with the various devices may be maintained for analysis by the interested and authorized parties. When users generate a personal profile, or when a profile is generated for the users, they may be associated with one or more other customers sharing particular devices or device types and personal situations. In other words, the user may be associated with a cohort of similar households based on the user's profile and/or other information related to the user's household, such that a level of expected usage based on the usage of the cohort members may be estimated for the user when actual usage information associated with the user is unknown, insufficient, or incomplete. The usage information associated with those persons having similar or the same device can then be used to calculate the estimated usage amounts and estimated costs associated with a new device, allowing the initial resource allocation for that particular new device to be estimated and initially added to the master resource allocation. While energy costs may vary across locations and contracts, estimated usage amounts may be considered more consistent and used to derive the estimated actual costs based on the user's particular contract and rate information.

The described solution for initially generating the master resource allocation can provide significant benefits in setting up initial master resource allocations and can avoid having users make up estimations without a basis in experience or qualification. In some instances, the solution can provide recommendations for comparative shopping solutions, where the purchase cost of the particular device can be combined with an estimated usage amount and cost, such that the full cost of different devices can be considered. Additionally, the solution could allow for multiple users in a multi-tenant situation to better understand the costs to be split based on a newly added device.

In alternative implementations, a similar solution may be provided for adding one or more new connected devices into an existing master resource allocation. In adding the new devices, one or more previously existing connected or non-connected devices may be replaced by the new device, such as a one-to-one replacement of a dishwasher, washing machine, dryer, lamp, thermostat, etc. In some instances, the new device may replace multiple existing devices, such as a new overhead light fixture and fan which replaces one or more existing lamps and fans. By adding the device, the resource allocation needs to be updated to correspond to the added or decreased efficiency of the replacement device. Further discussion of such instances is provided below with reference to FIG. 6.

Figure 5:
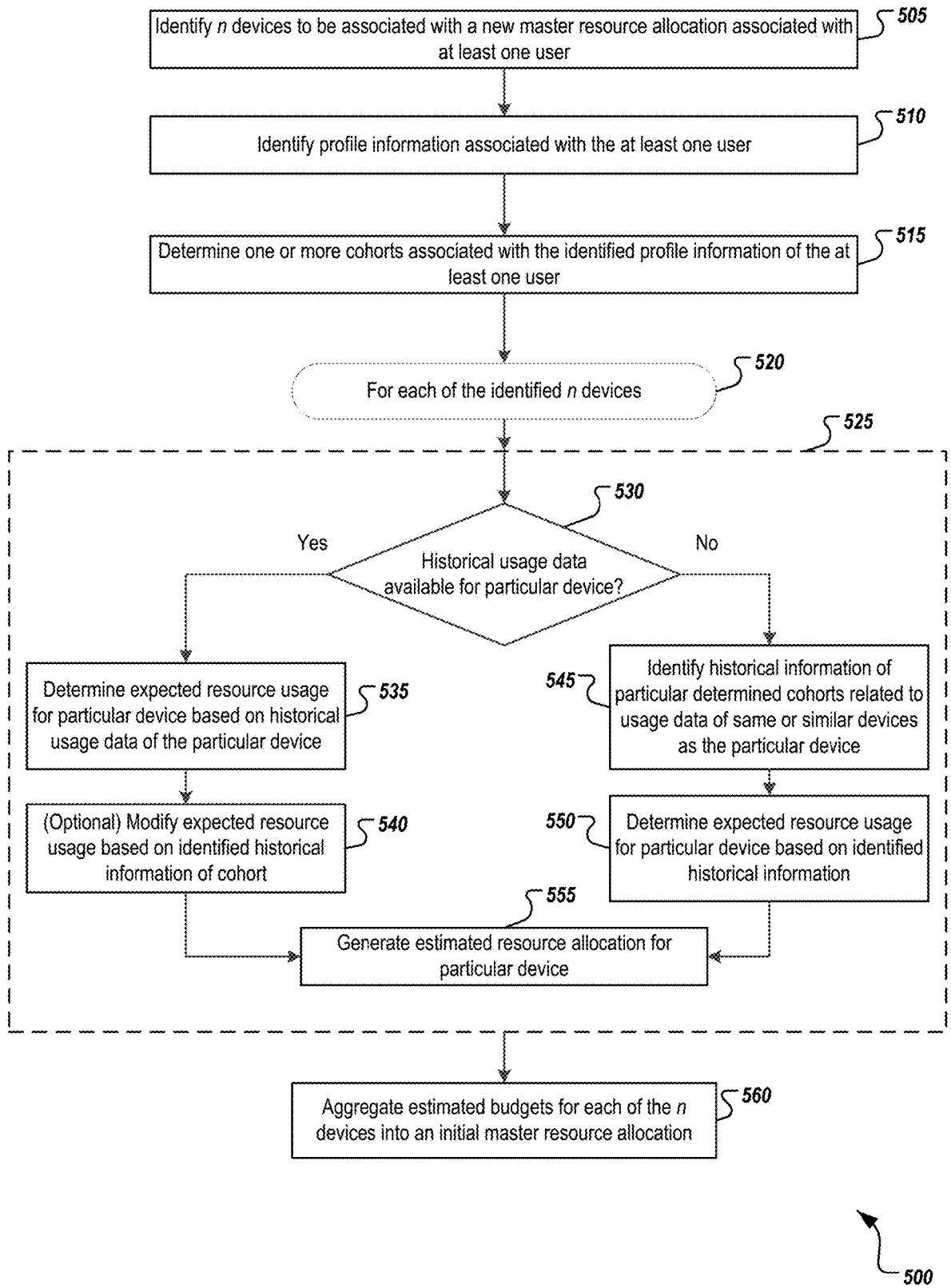
FIG. 5 is a flowchart of an example operation for determining an initial master resource allocation to be used for one or more network-connected devices.

FIG. 5 is a flowchart of an example operation for determining an initial master resource allocation to be used for one or more network-connected devices. For clarity of presentation, the description that follows generally describes method 500 in the context of the system 100 illustrated in FIG. 1. However, it will be understood that method 500 may be performed, for example, by any other suitable system, environment, software, and hardware, or a combination of systems, environments, software, and hardware as appropriate. For example, in the implementation used by method 500, additional components in FIG. 1 may include cohort information and estimated usages for different devices, device types, and models, as well as a database of information identifying particular device models and their comparative models for evaluation. Further, one or more of the connected devices 130 may be associated with or include information on historical usage amounts, where appropriate.

At 505, n connected devices to be associated with a new master resource allocation associated with at least one user are identified. Any number of n devices may be added to the master resource allocation, as long as n is greater than or equal to 1. In some instances, a new master resource allocation may be a revised master resource allocation, where one or more connected devices are to be added to an existing budget. In other instances, the n devices may be added to a totally new resource allocation, where no previous resource allocation existed. The at least one user may be a single user or user group, such as an individual or family. In other instances, the at least one user may include a plurality of users in a multi-tenant situation, where the multiple users may split or otherwise divide the responsibilities of the master resource allocation.

At 510, profile information associated with the at least one user may be identified. The profile information, as described above, may provide information related to the at least one user, including a family size, family makeup, location of the user, and other information related to the user that may assist in calculating the master resource allocation. For example, the profile may be used, where appropriate, to identify similar households or cohorts of households that can be used to estimate an estimated usage amount associated with various connected devices. At 515, one or more cohorts associated with the identified profile information of the at least one user can be determined. The cohorts may be associated with different devices and/or device types in addition to being associated with particular household information and groups.

At 520, for each of the identified n devices, a device-specific analysis 525 can be performed. The n device-specific analyses can be performed concurrently, consecutively, or in any suitable combination, permutation, or order. As described, some of the n devices may be newly acquired devices, while others of the n devices may be devices in which some historical usage information is available. The device-specific analysis 525 for each of the n devices can consider available historical information and/or use cohort-based data, where appropriate.

At 530, a determination is made as to whether the particular device has available historical usage data. The historical usage data may be available at the particular device, at a hub or controller associated with the device, or at an accessible remote location. As previously noted, the particular device may be an existing connected device that has not been a part of the master resource allocation previously, such that historical data is available to the user. In other instances, the particular device may be an acquired device with known historical usage, such as at a newly acquired home. If the particular device does have available historical usage data, method 500 continues at 535.

At 535, an expected resource usage for the particular device can be determined based on the device's historical usage. The expected resource usage may factor in current or expected rates of usage, such as prices per kilowatt hour, price per gallon, or other rates based on an expected usage amount. In some instances, the expected resource usage may be modified based on information associated with one of the determined cohorts at 540. For example, if a connected device is acquired in a sale of property, the prior historical usage may not be representative of the expected usage of the new owner. The same may be said where the connected device is acquired used. In those instances, at 540, the expected resource usage may be adjusted based on information from the determined one or more cohorts, where the usage and spending associated with and by those cohort members may cause an adjustment to the expected resource usage. Method 500 can then continue to 555, where the estimated resource usage for the particular device is generated after the calculations are performed. The estimated resource usage can be stored or otherwise maintained for later use.

When the determination of 530 indicates that no historical usage data is available for the particular device, or where the historical usage data does not correlate to an expected usage amount by the user (e.g., in a new house acquisition), method 500 moves from 530 to 545. At 545, historical information is identified from one or more of the cohorts that relates to an expected usage of the particular device. In some instances, the historical cohort information may not be related to the particular device itself, but to devices similar to the particular device. Based on that historical information, an expected resource usage for the particular device can be determined at 550. Method 500 continues on to 555, where the estimated resource usage for the particular device is generated.

Upon completion of the individual device estimated resource usages, at 560, the estimated resource usages for each of the n devices can be combined into an initial master resource allocation (or added to an existing master resource allocation). Different devices may be categorized and added to a category or group of related devices. As budgetary periods pass, the master resource allocation may be adapted and updated to better reflect the actual usage and spending of the user. The usage may be collected by the authorized entities and used in generating new budgets for other similarly situated users and customers.

As detailed above, a second implementation of the present disclosure is the replacement of an existing device with a new connected device. In such instances, the new connected device may be replacing an existing connected or a non-connected device. In instances where the new connected device replaces an existing connected device, tracked usage, technical parameters, and usage information associated with the existing connected device being replaced will be available. If the device being replaced was not a connected device, technical parameters identifying the device can be used to estimate a usage amount associated with the non-connected device. Further, information on the technical parameters of the new device can be used in comparison to the replaced device, allowing an estimated change in resource usage to be calculated. Using the comparison of the new connected device to the replaced device (based on the information available) outputs a modified resource usage estimation due to the new connected device within the resource allocation, allowing for a quick replacement and update to the resource allocation.

In some instances, the new device being added to the resource allocation may not be a connected device, but instead may be managed and monitored by a connected device. One example of such an instance is the addition of a new HVAC unit, where the HVAC unit is managed and monitored by a smart thermostat. The thermostat can manage the operations of the device. The thermostat is aware and manages/modifies the operational parameters preferred by the users associated with the existing and replacement HVAC (e.g., the temperatures at which the thermostat is kept), as well as the corresponding resource usage by the HVAC previously required to meet those parameters. Based on the known operational parameters and the technical parameters of the new HVAC system, an estimated energy and/or other resource usage requirement for the new HVAC system can be calculated to match the known operational parameters. A more efficient HVAC system being added will require less energy than the old HVAC system, allowing for a reduced resource usage estimate, allowing the resource allocation for the replacement HVAC system to lower than the resource allocation for the existing HVAC system.

FIG. 6 is a flowchart of an example operation 600 for determining a modification to an existing resource allocation in light of a newly added connected device replacing an existing device included in the existing resource allocation. For clarity of presentation, the description that follows generally describes method 600 in the context of the system 100 illustrated in FIG. 1. However, it will be understood that method 600 may be performed, for example, by any other suitable system, environment, software, and hardware, or a combination of systems, environments, software, and hardware as appropriate. For example, in the implementation used by method 600, additional components in FIG. 1 may include cohort information and additional technical information allowing for estimated usages to be calculated for different devices, device types, and models, as well as a database of information identifying particular device models and their comparative models for evaluation. Further, one or more of the connected and/or non-connected devices associated with a system involving a replacement device may be associated with or include information on historical usage amounts and existing usage information, where appropriate.

At 605, a new connected device is identified—in some instances by the hub device—to replace an existing device in a system or environment associated with a master resource allocation. The existing device being replaced may be either a connected device or a non-connected device associated with the master resource allocation. The type of device being replaced with regard to its connected status determines, in part, the operations of method 600.

At 610, the hub device can determine historical usage information associated with the device being replaced. As the hub device manages the resource allocation and information related to the usage of devices associated therewith, the hub device may be able to access certain information related to the existing device being replaced. Where the device being replaced is a connected device, or is monitored by a connected device (e.g., the HVAC as monitored by a smart thermostat or other smart device, including the hub device), historical resource usage information associated with the existing device is obtained at 615a from a stored or otherwise available set of historical information. The historical information about the existing device can be used to identify the previous and expected resource usages associated with the existing device, as well as other historical tracking parameters associated with the device.

If, however, the device being replaced is a non-connected device without a direct monitoring of the device by a particular connected device, alternative actions for determining the historical resource usage information are used. At 615b, technical parameters associated with the device being replaced can be determined. The technical parameters may be available to the hub device, while in other instances those technical parameters may be obtained from a local or remote repository providing product details associated with the device. Based on the technical parameters, an estimated resource usage can be calculated. In some instances, non-connected device historical usage data may be available. The non-connected device information may be available via a smart meter (e.g., a total energy consumption is known, where after removing the known consumption from the one or more connected devices, the non-connected device usage is known). In some instances such information may be aggregated for all non-connected devices associated with the meter, while in other instances, the usage information may be specific to the single non-connected device. Where the usage is shared, the technical parameters of the device can be used, in part, to estimate the portion of the non-connected device usage attributable to the existing device.

At 620, the existing operational parameters associated with the device being replaced can be determined by the hub device. The operational parameters can describe how the device is being used, including a range or description of activities, a timing of operation, a type of operation, a mode of operation, and others. This information can be used to determine the estimated resource usage of the new replacement device when incorporated into the system.

At 625, technical parameters associated with the new connected device are identified. These technical parameters can include efficiency information, energy requirements, operational modes and available options, and other information about the new connected device. Optionally, at 630, cohort information from other uses in possession and tracking usage of the new connected device may be identified and included in future estimates of usage. The cohort information may relate usage of the new connected device for particular similarly situated demographic groups (e.g., single professionals, young executives with families, retired persons, etc.), using that common information to extrapolate one or more likely usage scenarios for the new connected device.

At 635, the hub device, using the information identified/determined regarding the existing device and the new connected device, calculates a potential or likely change in the expected resource usage for the resource allocation based on the replacement of the new connected device for the existing device. In some instances, the calculation is performed by comparing the resource usage of the existing device to the expected resource usage of the new connected device after replacement. At 640, the hub device can update the master resource allocation based on the calculated change of 635. In such instances, the replacement of the devices can be quickly and efficiently incorporated into the master resource allocation.

In some instances, at 645, the hub device can identify at least one operational modification to at least one connected device associated with the resource allocation based on the updated resource allocation. For example, if the expected resource usage of the new device is less than the now-replaced device, the hub device can determine that additional resources may be available in the system. In such instances, such as where the operations of at least one connected device have been reduced previously due to the overall resource usage, those operations may be increased due to the gained resources available after the replacement. Similarly, if the expected resource usage of the new connected device is higher than the usage of the replaced device, one or more changes to manage the overall resource usage may be identified for one or more connected devices. In instances where such an operational modification is identified, the hub device can transmit, at 650, instructions to the at least one connected device to perform the at least one identified operational modification.

In some instances, connected devices and/or non-connected devices may be associated with and can use multiple resources and resource types. For example, a hot water tank may track both the water usage and the gas or electrical consumption. By overlaying general usage data when considering a tankless water heater, for example, it may be possible to predict potential excess resource savings to be allocated to other resources. Costs associated with the comparison could be compared using a conversion of values associated with resource usage types, thereby allowing the system to compare electrical resources to gas resources to water resources, and understand the impact of the potential or upcoming replacement.

The preceding figures and accompanying description illustrate example systems, processes, and computer-implementable techniques. While the illustrated systems and processes contemplate using, implementing, or executing any suitable technique for performing these and other tasks, it will be understood that these systems and processes are for illustration purposes only and that the described or similar techniques may be performed at any appropriate time, including concurrently, individually, or in combination, or performed by alternative components or systems. In addition, many of the operations in these processes may take place simultaneously, concurrently, and/or in different orders than as shown. Moreover, the illustrated systems may use processes with additional operations, fewer operations, and/or different operations, so long as the methods remain appropriate.

One potential alternative implementation may include a master budget wherein network-connected devices can be associated with different individuals to allow allocation of costs across multiple customers. In this implementation, device usage can be tracked across multiple individuals or entities, allowing those individuals or entities to pay for specific device operations. When coordinating among those individuals or entities, the master budget can be used to manage relatively balanced spending across the group. Additionally, non-connected device costs may be included in the master budget to offset device-based spending. For example, roommates or office coworkers may be assigned to or associated with different connected devices, as well as static or outside costs associated with the space such as rent. Using the master budget, rules may be enforced such that spending is best equalized across the individuals or entities by suggesting operational modifications based, at least in part, on the relative spending of each of the customers. Additionally, if certain devices associated with a particular customer are used more than other devices, those portions of the budget can be assigned to that customer.

In a second potential implementation, the master budget can be associated with and thereby manage actions at two or more locations or spaces. Such instances may include a primary residence and a vacation home, where the master budget is meant to cover usage of both locations. Because the vacation home may not be in use full-time, the budget may be zero or near zero for the vacation home during non-vacation periods where no costs or few costs associated with the vacation home occur. During vacations, the master budget can change (manually or automatically) to turn the primary residence to a reduced spending state while increasing the budget related to the vacation home. This shifting of budgets may be done manually, or the shift may be automatic as the connected devices identify usage at the vacation home and not the primary residence.

The operational modifications described herein may be permanent or temporary modifications. In some instances, the modifications may last for the rest of the budgetary period in which they were made, unless additional changes and savings have occurred such that the temporary modifications can be removed and returned to the pre-modification level. In other instances, some of the modifications may be permanent until removed or changed by the customer. This can allow the customer to elect savings over the initial settings, thereby maintaining the savings over multiple budgetary periods. In some instances, different modifications may be seasonal in length—e.g., changes to the air conditioning in November can be reversed in May as temperatures rise. Further, the master budget itself may seasonally adjust based on historical usage and/or current and upcoming weather forecasts. Similarly, the master budget may be modified and/or adjusted based on any suitable inputs, including weather forecasts, calendaring and schedules, and/or commodity pricing, as appropriate.

The present solution can be applied not only in the residential space, but also in a commercial or landlord space as well. For multi-building commercial use, as well as for multi-tenant usage, the master budget may include a primary overall budget and a resident- and/or tenant-specific budget. In other instances, each tenant or resident may be associated with their own master budget, and common areas managed by the landlord or owner will be associated with a master budget, with each person or entity maintaining rules and budgetary settings appropriate for their individual situation.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A device hub, the device hub managing a master resource allocation associated with a plurality of devices, wherein the device hub communicates with and manages operations of connected devices via a network connection, the device hub comprising:
a communication module;
a memory;
at least one hardware processor interoperably coupled with the memory and the communications module, the at least one hardware processor configured to:
identify a new connected device replacing an existing device associated with a master resource allocation, the master resource allocation defining an expected resource usage for a plurality of devices associated with the master resource allocation, the plurality of devices including the existing device;
obtain usage information associated with the existing device;
identify a set of existing operational parameters associated with the existing device;
determine an expected resource usage amount for the new connected device after replacement of the existing device;
calculate a change in the expected resource usage in the resource allocation based on the obtained usage information associated with the existing device and the expected usage amount for the new connected device;
update the master resource allocation based on the calculated change; and
modify operations associated with at least one connected device of the plurality of devices based on calculated change.

2. The device hub of claim 1, wherein the existing device being replaced by the new connected device is a connected device.

3. The device hub of claim 2, wherein obtaining the usage information associated with the existing device comprises obtaining a set of tracked historical usage information associated with the existing device.

4. The device hub of claim 1, wherein the existing device being replaced by the new connected device is a non-connected device.

5. The device hub of claim 4, wherein obtaining the usage information associated with the existing device comprises determining technical parameters associated with the existing device being replaced, and calculating historical resource usage by the existing device based, at least in part, on the determined technical parameters associated with the existing device and a tracked resource usage associated with the non-connected device.

6. The device hub of claim 1, wherein determining the expected resource usage amount for the new connected device after replacement of the existing device comprises:
identifying operational parameters associated with historical usage of the existing device; and
estimating a resource usage amount for the new connected device based on a calculation of the resource usage amount for the new connected device operating using the identified operational parameters associated with the historical usage of the existing device.

7. The device hub of claim 1, wherein obtaining the usage information associated with the existing device comprises:
identifying profile information associated with at least one user associated with the master resource allocation;
identifying, based on the identified profile information associated with the at least one user, similar cohorts of users associated with the at least one user and the identified profile information; and
estimating usage information for the at least one user associated with the master resource allocation based on usage information associated with the identified similar cohort of users associated with the at least one user.

8. The device hub of claim 7, wherein the identified similar cohort of users associated with the at least one user comprises a group of users corresponding to a demographic similarity of the at least one user, each user in the similar cohort of users having a similar device to the new connected device.

9. The device hub of claim 1, wherein the device hub is incorporated into a first connected device of the plurality of devices.

10. A computerized method performed by one or more processors of a device hub, the device hub managing a master resource allocation associated with a plurality of devices, wherein the device hub communicates with and manages operations of connected devices via a network connection, the method comprising:
identifying a new connected device replacing an existing device associated with a master resource allocation, the master resource allocation defining an expected resource usage for a plurality of devices associated with the master resource allocation, the plurality of devices including the existing device;
obtaining usage information associated with the existing device;
identifying a set of existing operational parameters associated with the existing device;
determining an expected resource usage amount for the new connected device after replacement of the existing device;
calculating a change in the expected resource usage in the resource allocation based on the obtained usage information associated with the existing device and the expected usage amount for the new connected device;
updating the master resource allocation based on the calculated change; and
modifying operations associated with at least one connected device of the plurality of devices based on calculated change.

11. The method of claim 10, wherein the existing device being replaced by the new connected device is a connected device.

12. The method of claim 11, wherein obtaining the usage information associated with the existing device comprises obtaining a set of tracked historical usage information associated with the existing device.

13. The method of claim 10, wherein the existing device being replaced by the new connected device is a non-connected device.

14. The method of claim 13, wherein obtaining the usage information associated with the existing device comprises determining technical parameters associated with the existing device being replaced, and calculating historical resource usage by the existing device based, at least in part, on the determined technical parameters associated with the existing device and a tracked resource usage associated with the non-connected device.

15. The method of claim 10, wherein determining the expected resource usage amount for the new connected device after replacement of the existing device comprises:

identifying operational parameters associated with historical usage of the existing device; and estimating a resource usage amount for the new connected device based on a calculation of the resource usage amount for the new connected device operating using the identified operational parameters associated with the historical usage of the existing device.

16. The method of claim 10, wherein obtaining the usage information associated with the existing device comprises:

identifying profile information associated with at least one user associated with the master resource allocation;

identifying, based on the identified profile information associated with the at least one user, similar cohorts of users associated with the at least one user and the identified profile information; and estimating usage information for the at least one user associated with the master resource allocation based on usage information associated with the identified similar cohort of users associated with the at least one user.

17. The method of claim 16, wherein the identified similar cohort of users associated with the at least one user comprises a group of users corresponding to a demographic similarity of the at least one user, each user in the similar cohort of users having a similar device to the new connected device.

18. A non-transitory, computer-readable medium storing computer-readable instructions executable by a computer and configured to:

identify a new connected device replacing an existing device associated with a master resource allocation, the master resource allocation defining an expected resource usage for a plurality of devices associated with the master resource allocation, the plurality of devices including the existing device;

obtain usage information associated with the existing device;

identify a set of existing operational parameters associated with the existing device;

determine an expected resource usage amount for the new connected device after replacement of the existing device;

calculate a change in the expected resource usage in the resource allocation based on the obtained usage information associated with the existing device and the expected usage amount for the new connected device;

update the master resource allocation based on the calculated change; and modify operations associated with at least one connected device of the plurality of devices based on calculated change.

19. The computer-readable medium of claim 18, wherein the existing device being replaced by the new connected device is a connected device.

20. The computer-readable medium of claim 19, wherein obtaining the usage information associated with the existing device comprises obtaining a set of tracked historical usage information associated with the existing device.

* * * * *